United States Patent [19]

Smith et al.

[11] Patent Number: 4,482,586
[45] Date of Patent: Nov. 13, 1984

[54] MULTI-LAYER POLYISOPHTHALATE AND POLYTEREPHTHALATE ARTICLES AND PROCESS THEREFOR

[75] Inventors: Richard R. Smith, Cuyahoga Falls; Charles L. Kern, Jr., North Canton, both of Ohio

[73] Assignee: The Goodyear Tire & Rubber Company, Akron, Ohio

[21] Appl. No.: 415,306

[22] Filed: Sep. 7, 1982

[51] Int. Cl.³ .................... B65D 1/02; B32B 7/02; B32B 27/08
[52] U.S. Cl. .................................. 428/35; 428/213; 428/480
[58] Field of Search .................. 428/480, 35, 213; 528/99, 294, 173; 525/444

[56] References Cited

U.S. PATENT DOCUMENTS

| | | | |
|---|---|---|---|
| 3,955,697 | 5/1976 | Valyi | 428/35 X |
| 4,098,769 | 7/1978 | Go | 528/99 |
| 4,110,315 | 8/1978 | Go | 528/294 |
| 4,145,517 | 3/1979 | Go | 528/173 |
| 4,234,708 | 11/1980 | Edelman et al. | 525/444 |
| 4,255,516 | 3/1981 | Kotoh et al. | 428/480 X |
| 4,363,853 | 12/1982 | Imamura et al. | 428/480 |
| 4,373,002 | 2/1983 | Petersen-Hoj | 428/480 |

Primary Examiner—Thomas J. Herbert
Attorney, Agent, or Firm—Alvin T. Rockhill

[57] ABSTRACT

A multi-layer polyester article, and particularly a beverage bottle having good oxygen and carbon dioxide permeability resistance. At least one layer of the article is made from polyisophthalate and copolymers thereof. The multi-layer articles find particular use as packaging materials, films, and molded containers such as for alcoholic beverages. Various colorants can be added to either one or more of the layers to impart a desired color to the article.

25 Claims, 1 Drawing Figure 4,482,586

MULTI-LAYER POLYISOPHTHALATE AND POLYTEREPHTHALATE ARTICLES AND PROCESS THEREFOR

TECHNICAL FIELD

The present invention relates to multilayer articles having at least one layer made from polyisophthalates or copolymers thereof, as well as processes for making the same.

BACKGROUND ART

Currently, there is a strong interest in the packaging industry in biaxially oriented containers made from poly(ethylene terephthalate) (PET). Containers constructed of PET have recently found wide acceptance in the packaging of food stuffs, medicines, and consumer products.

Despite the popularity of PET in container manufacture, there are several drawbacks to the use of PET. Although PET is usually considered a high barrier polymer, the use of PET containers for beer has heretofore been avoided due to the rapidity with which beer loses it flavor, due largely to oxygen migration into the bottle.

U.S. Pat. Nos. 4,049,361; 4,098,769; and 4,110,315 all to Santos Go, relate to copolyesters containing sulfone units therein and having a glass transition temperature of 75° C. or higher. Unoriented poly(ethylene terephthalate) generally has a glass transition temperature of about 72° C. Although the copolyesters of Go tend to have lower oxygen and carbon dioxide permeabilities than pure PET, they also have higher glass transition temperatures. Moreover, they do not relate to any multi-layer articles or to poly(ethylene isophthalate) layers therein having glass transition temperatures of less than 70° C.

U.S. Pat. No. 4,145,517 also to Santos Go relates to copolymers of polyesters also containing sulfone units therein. The glass transition temperature of the copolymers is at least 120° C. This patent also does not relate to multi-layer polyester articles or to layers therein having low glass transition temperatures.

The Kirk-Othmer Encyclopedia of Chemical Technology, Third Edition, 1978, Volume 3, at page 480, states that with regard to factors affecting barrier properties, a truly good barrier polymer must have some degree of polarity such as contributed by nitrile, etc., groups, high chain stiffness, inertness, close chain-to-chain packing, order, crystallinity, or orientation, some bonding or attraction between the chains, and a high glass transition temperature. Furthermore, at page 487, it is stated that permeation of carbon dioxide is an important factor in determining a high barrier polymer, especially for the use of highly carbonated beverages since carbon dioxide permeability rates are three to four times that of oxygen in almost all polymers. At page 490, it is stated that many foods are very sensitive to oxidation which causes flavor changes or discoloration. Moreover, it is noted that loss of 10 percent or more of carbonation can easily be detected by taste and that beer flavor is affected by oxygen levels of less than 2 parts per million.

U.S. Pat. No. 2,965,613 to Milone relates to copolymers of ethylene terephthalate and ethylene isophthalate. This patent is not pertinent in that it does not relate to multi-layer articles having good barrier resistance to oxygen or carbon dioxide.

U.S. Pat. No. 3,733,309 relates to biaxially molded poly(ethylene terephthalate) with regard to making containers.

U.S. Pat. No. 3,955,697 relates to a multi-layer, hollow plastic container having an inside and outside layer of heat-resistant plastic and an intermediate barrier layer of a thermoplastic material so that the barrier layer progressivley softens, or perhaps melts, and reforms in place upon exposure to elevated temperatures and subsequent cooling to ambient temperatures. This patent does not relate to any polyester layer whatsoever and hence is not pertinent.

U.S. Pat. No. 4,234,708 relates to the use of chain branching agents to produce polyethylene iso/terephthalate having at least 85 percent by weight of terephthalate therein. Thus, this patent is not pertinent since it utilizes very small amounts of isophthalic acid.

Although numerous multi-component or layered plastic articles have been made, none of them relate to solely a polyester multi-component article having very high barrier properties. For example, the following Chem Abstract numbers relate to multi-layer articles made from plastics other than polyesters: 84:32117u; 88:171414J; 141292b; 84:32124u; and 86:141006u. Various other Chem Abstract articles incorporate a layer or a portion of a layer in a multi-component article of polyester, as for example 85:144321h; 141229m; 91:75463r; 86:141090s; 84:31960b; 92:112365d; 92:149089f; 91:194287w; 92:23805e; and 87:7135c. However, none of these articles relate to multi-layer polyester articles. It is further noted that generally most high barrier plastics have high melt viscosities, making it very difficult to form them into a thin layer as required for multi-layer article production. Other plastics decompose when heated to a temperature such that they are extrudable. Still, other plastics have poor hot melt processabilities, or have high melt temperatures which induce crystallizability of PET when injection coated over a PET preform.

An article entitled "Gas Barrier Property and Multi-layer Blown Bottle" by Akira Kishimoto, Japan Plastics Age, November-December, 1976, pages 21–25, relates to a discussion of multi-layer blown bottles made by the coextrusion technique. An article entitled "Current Situations and Future Prospects of Plastic Bottles," also by Akira Kishimoto, November-December, 1976, Japan Plastic Age, relates to various types of plastics which have been utilized in making containers such as bottles. However, neither of these articles relates to multi-layer bottles utilizing solely polyester and in fact states on page 20, of the second article, that all of the multi-layer bottles lack clarity and appearance as compared with those of stretched PET and PVC.

DISCLOSURE OF INVENTION

It is therefore an aspect of the present invention to provide a multi-layer article made solely from polyesters.

It is a further aspect of the present invention to provide a multi-layer polyester article, as above, which has at least one layer of a polyisophthalate material or a copolymer thereof and at least one layer of a polyterephthalate polyester material or a copolymer thereof.

It is another aspect of the present invention to provide a multi-layer polyester article, as above, having good permeability resistance to oxygen and carbon dioxide.

It is yet another aspect of the present invention to provide a multi-layer polyester article, as above, having good properties and yet maintaining good barrier properties.

It is yet another aspect of the present invention to provide a multi-layer polyester article, as above, having an oxygen permeability of less than 8 cc.mil/100 in$^2$.day.atm and a carbon dioxide permeability value of less than 50 cc.mil/100 in$^2$.day.atm.

It is yet another aspect of the present invention to provide a multi-layer polyester article, as above, wherein said polyterephthalate layer is poly(ethylene terephthalate), and wherein said polyisophthalate is poly(ethylene isophthalate).

It is yet another aspect of the present invention to provide a multi-layer polyester article, as above, wherein in any article having an inner layer and an outer layer, said polyisophthalate is said outer layer and said polyterephthalate is said inner layer.

It is yet another aspect of the present invention to provide a multi-layer polyester article, as above, wherein said article is a container for beverages such as soft drinks, juices, etc., as well as for alcoholic beverages.

It is yet another aspect of the present invention to provide a multi-layer polyester article, as above, wherein said article is formed by seqential injection molding of one layer over another layer.

It is yet another aspect of the present invention to provide a multi-layer polyester article, as above, wherein said article is formed by coinjection molding, sequential injection molding, forming one layer and then forming the remaining layer as by dip-forming, and the like.

It is yet another aspect of the present invention to provide a multi-layer polyester article, as above, wherein one or more of said layers has colorants therein.

It is yet another aspect of the present invention to provide a multi-layer polyester article, as above, wherein said colorant is at least in said polyisophthalate layer.

It is yet another aspect of the present invention to provide a multi-layer polyester article, as above, wherein said article is blow-molded into a beverage bottle.

These and other aspects of the present invention will become apparent from the following description which sets forth the best mode and the preferred embodiments of the invention.

In general, a multi-layer packaging material, comprises:

(a) at least a layer made from a polyterephthalate compound or copolymers thereof, said polyterephthalate compound made by the reaction of terephthalic acid or esters thereof with ethylene glycol and up to 30 mole percent of one or more glycols having from 3 to 12 carbon atoms, said polyterephthalate copolymer made by reacting terephthalic acid or esters thereof and up to 30 mole percent of a 4 to 40 carbon atom dicarboxylic compound with ethylene glycol and up to 30 mole percent of one or more of a 3 to 12 carbon atom glycol, said polyterephthalate copolymer made by the reaction of one or more different said dicarboxylic compounds or one or more different said glycols, said dicarboxylic compound being other than terephthalic acid or an ester thereof and selected from the group consisting of an alkyl dicarboxylic acid, an aryl dicarboxylic acid, an alkyl substituted aryl dicarboxylic acid, a dimer carboxylic acid, a diester of an alkyl dicarboxylic acid, a diester of an aryl or alkyl substituted aryl carboxylic acid, an alkali sulfo dialkyl isophthalate, and combinations thereof;

(b) at least a layer made from a polyisophthalate compound or copolymers thereof, said polyisophthalate being the reaction product of an isophthalic compound and a glycol having from 2 to 12 carbon atoms, said isophthalic compound selected from the group consisting of isophthalic acid, and an alkyl ester of isophthalic acid having from 10 to 20 carbon atoms, said diol being ethylene glycol and containing from 0 to 60 mole percent of one or more compounds selected from the group consisting of a glycol having from 3 to 12 carbon atoms, a glycol ether having from 4 to 12 carbon atoms, and combinations thereof; said copolymers of said polyisophthalate being the reaction product of said isophthalic compound, said diol, and up to 60 mole percent of a dicarboxylic compound having from 4 to 40 carbon atoms based upon said isophthalic compound and said dicarboxylic acid or said ester thereof, said dicarboxylic acid or ester thereof being other than said isophthalic compound.

In general, a process for making a multilayer packaging material, comprises the steps of:

(a) forming at least one layer made from a polyterephthalate compound, or copolymers thereof, said polyterephthalate made by the reaction of terephthalic acid or esters thereof with ethylene glycol and up to 30 mole percent of one or more glycols having from 3 to 12 carbon atoms, said polyterephthalate copolymer made by the reaction of terephthalic acid or esters thereof and up to 30 mole percent of one or more 4 to 40 carbon atom dicarboxylic compound, with ethylene glycol and up to 30 mole percent of one or more glycols having from 3 to 12 carbon atoms, said dicarboxylic compound being other than terephthalic acid or an ester thereof and selected from the group consisting of an alkyl dicarboxylic acid, an aryl dicarboxylic acid, an alkyl substituted aryl dicarboxylic acid,, a dimer carboxylic acid, a diester of a dicarboxylic acid, a diester of an aryl or an alkyl substituted aryl diester, an alkali sulfo dialkyl isophthalate, and combinations thereof;

(b) forming at least one layer made from a polyisophthalic compound or a copolymer thereof, said polyisophthalate being the reaction product of an isophthalic compound and a glycol having from 2 to 12 carbon atoms, said isophthalic compound selected from the group consisting of isophthalic acid, and an alkyl ester of isophthalic acid having from 10 to 20 carbon atoms, said glycol being ethylene glycol and containing from 0 to 60 mole percent of one or more compounds selected from the group consisting of a glycol having from 3 to 12 carbon atoms, a glycol ether having from 4 to 12 carbon atoms, and combinations thereof; said copolymers of said polyisophthalate being the reaction product of isophthalic compound, said diol, and up to 60 mole percent of a dicarboxylic compound having from 4 to 40 carbon atoms based upon said isophthalic compound and said dicarboxylic acid or ester thereof, said dicarboxylic acid or ester thereof being other than said isophthalic compound; and contacting said polyisophthalate layer with said polyterephthalate layer and forming the packaging material.

BEST MODE FOR CARRYING OUT THE INVENTION

Figure 1:
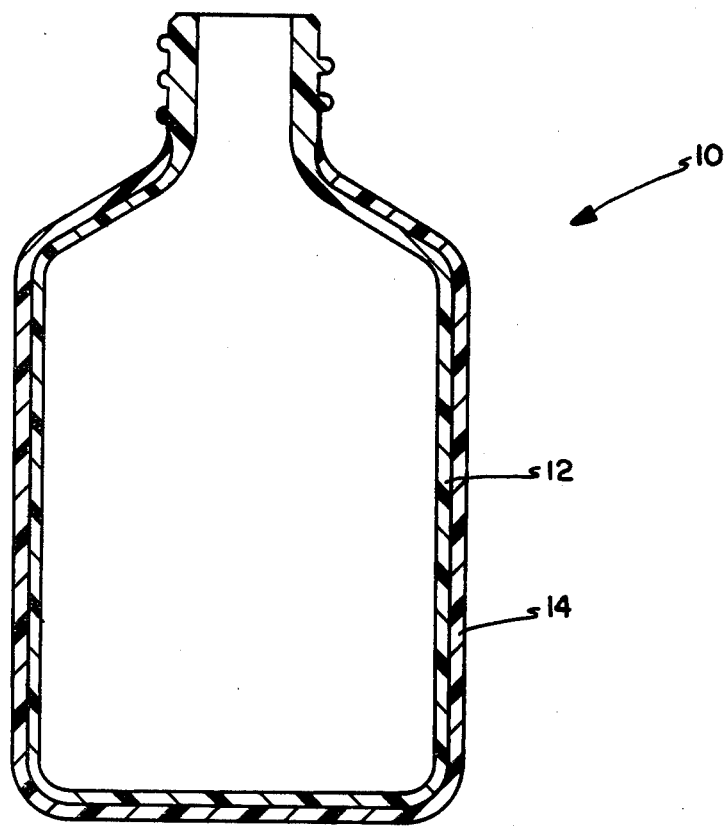
FIG. 1 is a side cross-sectional view showing a beverage bottle made according to the present invention containing two layers of different polyester materials therein.

The present invention relates to a multilayer article made from polyester materials. At least one of the layers of the article is made from a polyisophthalate and has very high barrier properties with regard to oxygen and carbon dioxide. At least one of the remaining layers is generally made from a non-polyisophthalate, hereinafter referred to as a polyterephthalate material or copolymer thereof which generally has good physical properties such as strength, clarity, impact, and the like. The combination of such two different layers results in a high strength yet high barrier resistant article with regard to carbon dioxide and oxygen. The various layers of the article may contain any colorant, that is dye, or pigment. Moreover, whenever the article is utilized with food, the side contacting the food is preferably poly(ethylene terephthalate) since it has FDA approval.

The high barrier polyisophthalate is produced by the reaction of an isophthalic compound, that is isophthalic acid, or esters of isophthalic acid, with ethylene glycol and optionally up to about 60 mole percent of a diol containing from 3 to 12 carbon atoms. The alkyl esters of isophthalic acid can generally contain a total of from 10 to 20 carbon atoms, with from 10 to 16 carbon atoms being preferred. Specific examples of diesters of isophthalic acid include dimethylisophthalate and diethylisophthalate, with these two compounds being preferred.

Since poly(ethylene isophthalate), hereinafter abbreviated PEI, is a highly preferred polyisophthalate, ethylene glycol is utilized in the reaction with the isophthalic compound. Although, as noted, whenever up to about 60 mole percent of one or more glycols having from 3 to 12 carbon atoms is utilized with ethylene glycol, it is desirable that diols containing 10 carbon atoms or less and preferably 8 carbon atoms or less, especially aliphatic or cycloaliphatic diols, be utilized. Example of diols include propylene glycols such as trimethylene glycol, butylene glycols such as tetramethylene glycol, neopentyl glycol, cyclohexanedimethanol, and the like. Generally, a glycol is utilized such that the polyisophthalate or copolymers thereof have a glass transition temperature of generally from about 35° to about 100° C., and desirably from about 55° to about 75° C.

Generaly, the amount of the non-ethylene glycol utilized is 45 mole percent or less, and desirably 35 mole percent or less. Examples of such preferred diols include cyclohexanedimethanol, tetramethylene glycol, and trimethylene glycol.

Another class of diols include the glycol ethers which contain from 4 to 12 carbon atoms, preferably 4 to 8 carbon atoms, with specific examples including diethylene glycol and 1,4-dihydroxyethoxy benzene.

The isophthalate compound, that is isophthalic acid, or esters thereof, which is reacted with the glycols can optionally be made with up to 60 mole percent of a dicarboxylic acid or ester thereof, herein defined as a non-isophthalic compound or a phthalic compound to form a random or block copolymer. The isophthalic compound reaction as well as the use of the optional dicarboxylic acid or ester thereof (other than an isophthalic compound) is made utilizing conventional amounts of conventional catalysts, additives, and the like, for example, colorants, chain branching agents, stabilizers, and the like.

By the present invention, whenever the term polyisophthalate is utilized, it is to be understood that the polyester is made from isophthalic acid, or esters thereof, with a glycol, that is, at least 40 mole percent of ethylene glycol and up to 100 mole percent thereof, although the glycol can contain up to 60 mole percent of the above-noted 3 to 12 carbon atoms glycols which include the glycol ethers. Regardless of whether a polyisophthalate polymer is made or a copolymer thereof, using a terephthalic compound, that is, a non-isophthalic compound such as dicarboxylic acid or ester thereof (other than isophthalic acid or an ester thereof), generally all of the various reactants are added and made in a conventional manner. For example, all reactants are commonly added to the esterification or the transesterification stage, and followed by a polycondensation stage to produce the polyesters of the present invention. Although block copolyesters can be produced according to the present invention by conducting the non-isophthalic compound reaction separate from the isophthalate compound reaction, and reacting the two products together in a conventional manner known to the art to obtain said block polyesters, random linear copolymers are preferred. As also known to the art, random copolyesters can be obtained even by adding the non-isophthalic compound at nearly the end of the transesterification or esterification stage.

The present invention also relates to polyisophthalates or polyesters thereof made according to U.S. Pat. Nos. 4,424,337, 4,418,188, or 4,403,090, filed simultaneously herewith, as with protonic acids, or with protonic acids and intrinsic viscosity modifying agents whereby cyclic dimer content and other impurities are reduced. The present invention also relates to forming at least one layer of the article with a blend of a polyisophthalate and polyterephthalate, or copolymers of either or both as set forth in U.S. Ser. No. 415,211 filed simultaneously herewith. In general, any polyisophthalate or copolymer thereof can be utilized which is compatible with the remaining polyester layer as described below.

When a polyisophthalate copolymer is made, the dicarboxylic acid or ester thereof has from 4 to 40 carbon atoms and which, as noted, is not an isophthalic compound or ester thereof. Thus, the dicarboxylic acid can be an alkyl dicarboxylic acid, an aryl dicarboxylic acid, an alkyl substituted aryl dicarboxylic acid, a dimer acid, or esters thereof, or an alkali salt of sulfo dialkyl isophthalate. Alkyl dicarboxylic acids desirably contain from 4 to 12 carbon atoms. If the acids are aryl or alkyl substituted aryl acids, they desirably contain from 8 or 9, respectively, to about 16 carbon atoms. Dimer dicarboxylic acids can also be utilized. Typical examples of linear or alkyl dicarboxylic acids include glutaric acid, adipic acid, azelaic acid, sebacic acid, and the like.

The dimer acid generally has a range of from about 34 to 40 carbon atoms and preferably 36 carbon atoms. The dimer is itself prepared from an unsaturated fatty acid containing 18 carbon atoms such as linoleic and linolenic acid or the monohydric alcohol esters thereof. The actual preparation and structure of dimerized $C_{18}$ fatty acids are described in J.A.C.S. 66,84 (1944) and U.S. Pat. No. 2,347,562, both of which are fully incorporated herein by reference. Several different grades of dimer acid are available from commercial sources and these differ from each other primarily in the amount of monobasic and trimer acid fractions and the degree of unsaturation. It is preferred, for purposes of this invention, that the dimer acid be substantially free of the monobasic and trimer acids fractions, that is less than 8 percent by weight, and essentially completely saturated, and be added after the transesterification reaction; that is, at the condensation stage. Two different grades of dimer acid, which are useful in preparing the copolyesters herein described and meet the above requirements are available from Emery Industries, Inc. under the trade name Empol 1010 dimer acid, typically containing 97 percent dimer acid, 3 percent trimer acid, and essentially no monobasic acids and extremely low unsaturation, and Empol 1014 typically containing 95 percent, 4 percent, and 1 percent of dimer, trimer, and monobasic acids, respectively.

Moreover, the dicarboxylic acid utilized in preparing the copolyesters can be an aryl or an alkyl substituted aryl acid containing from 8 or 9, respectively, to about 16 carbon atoms. Typical examples of aryl acids include terephthalic acid, orthophthalic acid, naphthalic acids, for example, 2,6-naphthalene dicarboxylic acid, phenyl indane dicarboxylic acid, and the like. Specific examples of alkyl substituted aryl acids include the various isomers of dimethylphthalic acid such as dimethylorthophthalic acid and dimethylterephthalic acid, the various isomers of diethylphthalic acid such as diethylorthophthalic acid and diethylterephthalic acid, the various isomers of dimethylnaphthalic acid such as 3,7-dimethyl-2,6-naphthalene dicarboxylic acid and 2,5-dimethyl-1,6-naphthalene dicarboxylic acid, and the various isomers of diethylnaphthalene dicarboxylic acid, and the like. Generally, terephthalic acid is preferred.

It is well known to those skilled in the art, in lieu of the various dicarboxylic acids, the various diesters thereof can be utilized. Thus, diesters of alkyl dicarboxylic acids containing a total from 6 to about 20 carbon atoms as well as diesters of aryl or alkyl substituted aryl acids containing from 10 or 11 respectively to about 20 carbon atoms may be utilized. As previously noted, esters of isophthalic acid are not within the definition of an ester of a dicarboxylic acid since they would not form a copolymer. Examples of diesters of alkyl dicarboxylic acids include those made from glutaric acid, adipic acid, azelaic acid, or sebacic acid, and the like. Typical examples of diesters of aryl dicarboxylic acids include dimethylterephthalate, a preferred compound, 2,6-dimethylnaphthalate, and the like. Examples of alkyl substituted aryl diesters include 3,6-dimethyl-dimethylterephthalate and 3,7-dimethyl-2,6-dimethyl-naphthalene dicarboxylate, and the like.

The alkali salts of sulfo dialkyl isophthalate have from 1 to 5 carbon atoms in the alkyl group with methyl being highly preferred. Of the various salts, sodium is preferred. Thus, a preferred compound is sodium sulfo dimethyl isophthalate. These monomers, if used in sufficient quantity, tend to make the copolymer water soluble.

The amount of the dicarboxylic acid or esters thereof (non-isophthalic compound) utilized with the isophthalic compound on a mole basis is generally from about zero (that is 0), or from about 0.1 to about 60 mole percent. Desirably, the amount is from about 0.0 or 0.1 percent to about 30 mole percent and preferably from about 0.0 or 0.1 percent to about 20 mole percent when an alkyl dicarboxylic acid or dimer acid is utilized. The mole percent is generally from about 0.0 to 0.1 to about 40 percent and preferably from about 0.0 or 1 to about 30 percent when aryl dicarboxylic acid, an alkyl substituted aryl dicarboxylic acid, or a diester of an alkyl or an aryl dicarboxylic acid, a diester of an alkyl substituted aryl dicarboxylic acid, or an alkali sulfo dialkyl isophthalate, is ultized. Such latter type compounds are preferred in the present invention.

The total amount of diols utilized in comparison to the total amount of acids (isophthalic compound and non-isophthalic compound) are conventional. Typically, the mole ratio of the total amount of diol utilized with the total amount of acid is approximately 1.05 to 2.5 and approximately 2.2 when esters are used in lieu of acids. Of course, much higher or lower ratios can be used as known to the art. Naturally, if the isophthalic compound is an ester and the copolymer is made, the other monomer is also preferably an ester, that is a diester of a dicarboxylic acid. When esters are used as a starting material, the polyester is therefore made using any conventional ester route as is well known to the art. If the isophthalic compound is an acid, and a copolymer is made, the other acid monomer is preferably a dicarboxylic acid (other than an isophthalic acid), etc., and the polyester is made according to any conventional non-ester route.

As previously noted, the article, be it a packaging material, a molded container, or the like, has at least one polyisophthalate or copolymer thereof layer made from the materials hereinabove set forth.

At least one of the remaining layers is made from a polyester other than said polyisophthalate compound and hereinafter called a polyterephthalate layer. Such remaining layer is made from conventional poly(ethylene terephthalate), a highly preferred compound, or from copolymers thereof. The polyterephthalate copolymer is made by reacting up to 30 mole percent, desirably 20 mole percent, and preferably 10 mole percent or less of any dicarboxylic acid or ester thereof having from 4 to 40 carbon atoms, other than terephthalic acid or an ester thereof, with up to 30 mole percent, desirably 20 mole percent, preferably 10 mole percent or less of a glycol having from 3 to 12 carbon atoms. When the copolyterephthalate layer is made, one or more different dicarboxylic acids or esters thereof or one or more different diols are utilized to form the copolymer along with the terephthalic acid and said ethylene glycol. The dicarboxylic acids or esters can be the same as set forth hereinabove with regard to the dicarboxylic compound utilized to make a copolymer with the isophthalic compound. Thus, the dicarboxylic acid can be an alkyl dicarboxylic acid having from 4 to 12 carbon atoms, an aryl dicarboxylic acid having from 8 to 16 carbon atoms, an alkyl substituted aryl dicarboxylic acid having from 9 to 16 carbon atoms, a dimer acid having from 34 to 40 carbon atoms, preferably 36 carbon atoms, a diester of an alkyl dicarboxylic acid having from 6 to 20 carbon atoms, a diester of an aryl or an alkyl substituted aryl dicarboxylic acid having from 10 to 11 respectively to 20 carbon atoms, or an alkali sulfo dialkyl isophthalate. It is to be understood that the 30 mole percent limit of non-terephthalic acid includes up to 30 mole percent of isophthalate acid or of esters therefore, as described and set forth above. Examples of such specific compounds are set forth above and are hereby incorporated and thus are not repeated at this point.

The glycols utilized in preparing a copolymer of polyterephthalate include any glycols having from 3 to 12 carbon atoms such as glycol ethers having from 4 to 12 carbon atoms, with preferably from 4 to 8 carbon atoms, constituting a subclass thereof. Desirably, the glycols have from 3 to 10 carbon atoms with 3 to 8 carbon atom diols being preferred. Examples of specific glycol ethers and glycols have been set forth above and are hereby incorporated and hence will not be repeated.

It is desirable that the polyterephthalate compound or copolyester thereof be compatible with polyisophthalic compound or copolymer thereof. Generally, when a polyterephthalate or copolymer thereof is utilized which is highly crystallizable, it might tend to crystallize during processing such as parison formation and cause difficulty in various processing procedures such as blow-molding, as well as obtainment of good adhesion with the polyisophthalate layer. Thus, a glass transition temperature, i.e., a Tg of from 60° C. to 100° C. and preferably from 65° C. to 75° C. is desired so that the polyterephthalate compound, or copolymer thereof, is generally amorphous. In general, the glass transition temperature of the polyisophthalate layer is preferably very close or equal to that of the polyterephthalate layer with regard to blow-molding various items, and is, for example, from about 35° C. to about 100° C. and preferably from about 55° C. to about 75° C. Thus, various compounds can be utilized to increase the glass transition temperature of the polyisophthalate compound such as the above-noted naphthalic acids, or other aromatic acids such as biphenyl dicarboxylic acid, and the like.

The polyterephthalate is made in a conventional manner well known to the art, utilizing conventional mole rations of the total amount of the diol to the acid, for example, approximately 1.1 to 2.5 when an acid is utilized, and approximately 2.2 moles of diol for every one mole when an ester of a dicarboxylic acid is utilized. Naturally, much higher or lower rations can also be used. Alternately, the polyterephthalate can be made in a manner as set forth in U.S. Pat. No. 4,418,188, filed herewith, which relates to the use of protonic acids, as well as to U.S. Pat. No. 4,424,337, filed herewith which relates to I.V. modified polyisophthalates.

Each of the layers, that is the polyisophthalate layer and the polyterephthalic layer can be made according to any conventional or common melt polymerization process, melt and solid state polymerization, and the like. Moreover, whenever an acid is utilized, the polyester can be made in a manner as set forth in U.S. Pat. No. 4,020,049 to Rinehart, which is hereby fully incorporated with regard to the method of making the polyester. Conventional temperatures, catalysts, amounts of catalysts, stabilizers, and the like, can all be utilized as well known to the art.

The polyisophthalates produced according to the present invention, or copolymers thereof, generally have an inherent viscosity of greater than 0.4, desirably greater than 0.5 dl/g. in a 60/40 phenol/tetrachloroethane solution at 25° C. Desirably, the intrinsic viscosity of the polyterephthalate compounds is 0.60 or greater and preferably 0.65 or greater.

The oxygen permeability of the polyisophthalate layer is less than 8 cc·mil/100 in.$^2$·day·atm, desirably less than 7, and preferably less than 5. When utilized in association with particularly susceptible items such as an alcoholic beverage, for example beer, etc., the oxygen permeability is preferably from about 1 to about 5. The permeability of carbon dioxide is generally 50 or less cc·mil/100 in.$^2$·day·atm, desirably 30 or less, and preferably 20 or less. These permeability levels are based upon an unoriented molded polyester film.

The film or molded article formed from at least a layer of a polyisophthalate material and the polyterephthalate material, for example, PET, exhibits good permeability resistance with regard to oxygen and carbon dioxide, and also good strength characteristics. Generally, the proportion by thickness of the polyisophthalate material to the PET material can range from about 10 percent to about 90 percent of the total thickness, desirably from about 20 percent to about 80 percent, and preferably from about 25 to about 75 percent of the total thickness. As previously noted, any number of layers can be utilized. However, often times only a total of two layers, one of each type polyester, is utilized to achieve a desired end product such as a packaging material, a molded container, an article, or the like.

The multi-layer articles of the present invention can thus be utilized as either packaging materials such as film, containers, and the like, for use with comestibles, for example food stuffs, as containers which can be blow-molded and used for beverages, for example, various juice drinks, such as orange juice, grape juice, etc., for carbonated beverages such as soft drinks, as medicine bottles, or as films to envelope various items, for example wrap, such as meat, groceries, and the like. A particular use is in the form of containers for various alcoholic beverages such as beer, wine, liquor, and the like. The multi-layer articles of the present invention are particularly suitable in packaging materials which require strength and yet have a low permeability with regard to oxygen and carbon dioxide. Since carbon dioxide tends to migrate out of a container and since oxygen can migrate into the container and quickly affect the taste of various items such as food stuff, wine, beer, champagne, liquor, and the like, the multi-layer articles of the present invention are particularly suitable for containing such items.

Various colorants may be utilized with either the polyisophthalate layer or the polyterephthalate layer, or in both materials. Whenever the multi-layer polyester article is utilized with regard to food stuffs, beverages, cosmetics, and the like, preferably the polyisophthalate constitutes an outer layer or a non-food stuff, etc., contacting layer and contains the colorants therein. This permits colorants to be utilized which otherwise could not be utilized with food stuff, beverages, etc. If colorants are utilized with the PET layer, it is preferred to only use FDA approved colorants. The colorants can be added at any stage during the preparation of the polyester material as during the esterification or transesterification stage, the polycondensation stage, during resin drying, during extruding, and the like. Generally, any colorant, that is dyes which are soluble, or inorganic or organic pigments can be utilized. Examples of dyes include the various azo dyes, anthraquinone dyes, azine dyes, and the like. Examples of inorganic pigments which are added to the polyester to impart a color or hue thereto include titanium dioxide, carbon black, iron oxide, chromium oxide greens, iron blue, chrome green, violet pigments, ultramarine pigments, titanate pigments, pearlescent pigments, metallic pigments such as aluminum, browns, powders, etc., and the like. Organic pigments include monazo pigments, disazo pigments, and the like. Naturally, various amounts are utilized to impart a desired color or hue and such amounts can range over a wide range.

The multi-layer articles, films, containers, and the like can be made utilizing many forming techniques or methods. For example, such items can be made by extruding, by the use of injection molding, through rotational molding, forming one of the layers by dipping in solution, and the like. In order to obtain good physical properties, somewhere during the forming process, it is desirable that orientation is imparted to the various polyester layers. Since the polyisophthalate and copolymers thereof will generally have low glass transistion temperatures, they naturally can be processed at lower temperatures than polyterephthalates. Such lower temperatures result in process energy-saving advantages as well as reducing undesirable byproducts such as linear and cyclic oligomers, as well as acetaldehyde. Also, lower temperatures permit coating without crystallizing the base preform.

Films can generally be formed by coextruding calendaring, or solvent casting. Orientation can be imparted to films as through streching the films through a series of rollers operating at different speeds in either one direction or in two directions 90 degrees normal to one another. Containers can be formed as through injection molding and rotational molding with the layered materials then being subjected to a later orientation process. A preferred method of forming a container is to injection mold a preform containing multiple layers therein and then to blow mold the preform, thereby imparting orientation thereto. Regardless of the forming technique or method, the polyterephthalate layer is generally located on the inside of the container, especially with regard to any food stuffs, and the like, to be contained therein, and the polyisophthalate layer is located on the outside of the two-layered article.

When laminates are made as by calendaring or extruding films, the two films can be co-extruded or simultaneously extruded or brought together while warm. Optionally, they can be separately made and then heated at temperatures near the glass transition temperature and then contacted together as by rolling. Regardless of procedure, the inherent adhesion between the two different types of polyesters has been found to be very good due to the compatibility of the layers. Accordingly, peel problems are very small or nil.

In making a preform, that is making a container through the injection molding technique, sequential injection molding can be utilized. That is, the first item can be injection molded, immediately transferred to a second cavity and then the second material injection molded thereover. Desirably, a first injection molded material is PET, with the second molded material being poly(ethylene isophthalate). This is convenient from a temperature standpoint in that the PET layer or article will tend to cool before insertion thereof into a second but larger mold, and therefore be at a lower temperature, since the polyisophthalate is molded at a lower temperature. Alternatively, the first item injection molded can be cooled as to ambient or room temperature, even stored if desired, inserted into a second mold and, optionally reheated with the second type of material being injection molded thereover.

If an article is made such as a container, for example, a bottle or the like, the multi-layer article can be made in the form of a reduced size, for example a preform, in a manner as set forth immediately above. The preform can contain any number of layers therein, but desirably has two layers, one of each material, and is then subjected to a reheat blow-molding operation. That is, the article such as a preform is reheated to a desirable temperature and then blow-molded. Not only does the blow-molding operation achieve biaxial orientation of the layers, thereby improving strength, but also produces the desired end product.

In the blow-molding operation, it is desirable to place the heating element or heat source adjacent to the inner or PET layer since this layer has a slightly higher blow-molding temperature. Thus, if a bottle were made, it would be desirable to heat from the inside. However, since this heating method is not readily practiced in bottle manufacture, the preform is generally heated from the outside to a temperature above a desirable blow-molding temperature of the polyisophthalate, thereby bringing the PET layer up to temperature. The preform is then permitted to cool for a short time so that the outside layer, that is the polyisophthalate layer, is cooled more rapidly than the inside layer. The preform is then subjected to a blow-molding operation.

Another method relates to dipping an already formed bottle into a heated polymer solution (either PEI or PET, or copolymers thereof) to form a coating thereon. Still another method relates to dipping a preform, e.g., PET, into a molten polyester (e.g., PEI) prior to blow-molding.

In the above illustration with regard to a container, for example, a bottle utilizing only PET and PEI as the two layers, the injection molding temperature of PET is as low as possible, as from about 500° F. to about 550° F. and desirably from about 510° to about 520° F. If a polyterephthalate or copolyterephthalate compound is utilized, it is important that it is injection molded at a temperature above its melting point but desirably as low as possible. When the second layer is injection molded thereover, be it via co-injection or sequentially, that is while the polyterephthalate layer is still warm or cool, the polyisophthalate or copolymer thereof is molded at a temperature of from about 400° F. to about 500° F., and desirably from about 440° F. to about 490° F. In accordance with the preferred embodiment, the injection molded bicomponent preform is subjected to a final forming operation including biaxially orientation, such as through stretch blow-molding. The polyisophthalate or copolymers thereof should be heated from about 50° to about 130° C. and desirably from about 70° C. to about 95° C. The blow-molding temperature of PET is generally from about 70° C. to about 130° C. and desirably from about 85° C. to about 110° C. Hence, any blow-molding operation which heats the various layers to the desired temperatures, or to common temperatures can be utilized, whether or not the various layers are heated to the same temperature. Naturally, the preform is simultaneously blow-molded, that is both layers are simultaneously blow-molded.

In general, numerous variations of the above process as well as other processes can be utilized in preparing multi-layer articles utilizing a polyisophthalate polyester and a polyterephthalate polyester. The net result of any such process is an article exhibiting an improved gas barrier along with the good strength and physical properties of the polyterephthalate layer. Generally, a bilayer article is desired due to ease of processing. Colorants may be added to any one or all of the layers as noted above, and the thicknesses of the various layers in proportion to one another can also be as noted above.

Furthermore, the adhesion between the two polyester layers has been found to be very good. Moreover, special techniques such as a corona discharge or a separate adhesive layer are not required as in the prior art. Unlike many prior art materials which simply cannot be extruded since the melt viscosity is too high to make a thin layer over a PET preform, etc., the present invention yields a good end product.

According to the present invention, a bi-layer bottle, generally indicated by the numeral 10 can be made as shown in FIG. 1. In this embodiment, the interior layer 12 is preferably poly(ethylene terephthalate). The outside layer 14 is preferably poly(ethylene isophthalate). The bottle can be prepared in a manner as set forth above and in the Examples.

The invention will be better understood by reference to the following examples.

EXAMPLE 1

Preparation of PET

Poly(ethylene terephthalate) was prepared in the manner set forth in U.S. Pat. No. 4,020,049 (Rinehart), using low molecular weight PET as a "heel" or solvent for the esterification reaction. Using this procedure, PET having intrinsic viscosity of about 0.59 was prepared by melt polymerization of ethylene glycol and terephthalic acid. Antimony trioxide was used as polycondensation catalyst along with a phosphorus stabilizer. The polymer was extruded from the reactor, quenched and pelletized.

The pelletized product was then solid state polymerized in a 3 cubic foot, double cone blender dryer to achieve a final polymer intrinsic viscosity of 0.72. This is accomplished by first crystallizing the pellets at about 170° to 180° C. under a nitrogen atmosphere, followed by a 4 to 6 hour reaction period at about 220° to 230° C. and 0.1 mm mercury. When the desired intrinsic viscosity is achieved, the polymer is discharged from the reactor and stored in a nitrogen gas atmosphere until preparation of the bottle preforms. The moisture level of the PET is desirably 0.005 weight percent or less for injection molding of the preforms.

EXAMPLE 2

Preparation of Poly(ethylene isophthalate) (PEI)

A stainless steel reactor was charged with 4.0 pounds of dimethyl isophthalate, 2.85 pounds of ethylene glycol, and 2.6 milliliters of a 6 percent solution of manganese octanoate in mineral spirits. This mixture was heated under a nitrogen gas atmosphere from 183° to 220° C. over a 2.5 hour period during which 730 milliliters of methanol was distilled from the reaction mixture. The mixer was then transferred to a stainless steel polymerization vessel and 0.456 grams of antimony trioxide was added. The reaction temperature was raised from 220° to 234° C. over a one hour period. The pressure was gradually reduced over the next hour to about 0.5 millimeter mercury while the temperature was being raised to 265° C. During the next hour, the temperature was increased to 275° C. After an additional 2 to 5 hours at these conditions, the reactor was restored to atmospheric pressure using nitrogen gas and the polymer extruded from the reactor, quenched and pelletized. The intrinsic viscosity of the polymer prepared in this manner was in the 0.7 to 0.9 range. This polymer was dried in a vacuum oven (about 0.5 mm mercury) at about 50° C. for a period of about 1 to 3 days prior to being used for preparation of bicomponent polyester bottles. The moisture level of the polyisophthalate is desirably about 0.01 weight percent or less.

EXAMPLE 3

Preparation of High Purity PEI

Following the general procedure of Example 2, PEI was prepared using sulfuric acid catalyst to produce a polymer containing very low levels of cyclic dimer product. A charge of 13.0 pounds of isophthalic acid, 5.8 pounds of ethylene glycol, and 3.4 grams of pentaerythritol was used. About 3 hours was required for the initial esterification reaction with water being distilled from the reaction mixture. After transfer to the polymerization reactor, an additional 2.5 pounds of ethylene glycol was charged to the reaction mixture. The reaction temperature was held at about 225° C. over the next hour while a vacuum of 0.5 millimeters of mercury was gradually applied. The reactor was then restored to atmospheric pressure with nitrogen gas and 47.6 grams of sulfuric acid solution (5 weight percent concentrated $H_2SO_4$ in ethylene glycol) was added. The vacuum was then restored over the next 45 minutes with the temperature being raised to about 250° C. Over the next two hours, the temperature was raised to about 260° C. and polymer having an intrinsic viscosity of 0.72 was obtained. This polymer contained a low level of cyclic dimer by-product (2 weight percent) making it particularly suitable for preparation of a bicomponent polyester bottle. This polymer was dried in the manner described in Example 2.

EXAMPLE 4

Poly(ethylene terephthalate) PET, as prepared in Example 1 to an intrinsic viscosity of 0.72 is dried to a moisture content of less than 0.005 weight percent in a counter-current flow dehumidifying dryer ($-20°$ C. dew point, 170° C. for 4 hours). The PET is then injection molded into a 45 gram preform (a hollow cylindrically shaped article with a closed end) 5.995 inches long, 0.910 inch outside diameter (O.D.), and a 28 mm external thread on the open end using a 300 ton injection molding machine. Conditions used for molding include:

extruder temperature: 530° F.
injection pressure: 500 psi
holding pressure: 200 psi
extruder pressure: 650 psi
back pressure: 0
injection time: 6.0 seconds
holding time: 6.5 seconds
cooling time: 13.5 seconds
total cycle time: 30.5 seconds
mold temperature: 42° F.

The PET preforms prepared using this method are clear, and amorphous.

EXAMPLE 5

Poly(ethylene isophthalate) (PEI) prepared in Example 2 to an intrinsic viscosity of 0.70 is dried to less than 0.01 weight percent water in a vacuum oven at 50° C. for several days. The PEI is then injection molded over the outside wall of the PET preform prepared in Example 4. The PET preform is held on a support pin while a 0.045 inch layer of PEI is injection molded to produce a two layer preform with a 1.000 inch (O.D.), 0.590 inch ID, an overall length of 6.040, and a weight of 61 grams.

Injection molding conditions used on the 75 ton injection molding machine include:
  extruder temperature: 480° F.
  injection pressure: 300 psi
  back pressure: 25 psi
  injection time: 3.0 seconds
  cooling time: 20 seconds
  total cycle time: 25 seconds
  mold temperature: 70° F.

The two layer preforms prepared using this method are clear and amorphous.

EXAMPLE 6

The two layer preforms prepared as in Example 5 is heated so that the PET layer reaches a temperature of 90°–100° C. while temperature of the PEI layer is maintained at 70°–90° C. Once this temperature is reached, the preform is blown into a 1 liter container 10.25 inches long with a 3.25 inch diameter. Blowing conditions include:
  Heat time: 200 seconds
  equilibration time: 140 seconds
  primary air delay: 0.25 seconds
  primary air blow: 12 seconds
  secondary air blow: 8 seconds
  primary pressure: 205 psi
  secondary pressure: 285 psi
  blow rate setting: 5-blue Using these conditions produces containers with both good clarity and biaxial orientation in both the PET and PEI layers improving the strength and impact properties. Containers produced showed an improvement in $O_2$ barrier as measured on an Oxtran 10/50. The $O_2$ permeability and thickness of the PET and PEI layers in the blown bottle are shown in Table I, Example C.

EXAMPLE 7

Bilayer preforms of PET and PEI with 0.100 PET and 0.105 inches of PEI were prepared as in Examples 4 and 5. The different layers were produced by removing 0.060 inches of the PET wall from the preform produced as in Example 4. The PEI layer of 0.105 inch was then molded as in Example 5. The resulting preforms were of good clarity.

The bilayer preforms were blown into 1 liter containers as in Example 6. The $O_2$ permeability and bottle wall thickness of the PET and PEI layers are shown in Table I, as Example B.

EXAMPLE 8

Bilayer preforms of PET and PEI with 0.060 inches of PET and 0.145 inches of PEI were prepared as in Examples 4 and 5. The different layers were produced by removing 0.100 inches of the PET wall from the preform produced as in Example 4. The PEI layer of 0.145 inches was molded as in Example 5. The resulting preforms were of good clarity.

The bilayer preforms were blown into 1 liter containers as in Example 6. The $O_2$ permeability and bottle wall thickness of the PET and PEI layers are shown in Table I, Example A.

EXAMPLE 9

Bilayer preforms of PET and PEI were prepared as in Examples 4 and 5. In this case, a colorant (0.1 weight percent soloaperm green) was blended with the PEI prior to injection molding to produce a colored preform. The colorant is not in the layer in contact with the contents of the container as it would be if it was in the PET. In addition, the PEI layer can be designed such that after blowing a uniform layer is on the bottle which would provide uniform color. When PET bottles with colorant in the PET are reheat blow-molded, the color depth is much greater in the thick areas and cannot be avoided.

The bilayer preforms with colorant are blown into bottles as outlined in Example 6.

TABLE I

PET/PEI BICOMPONENT PREFORMS AND BLOWN BOTTLES

| PET/PEI PREFORMS | | | | PET/PEI BOTTLES | | | |
|---|---|---|---|---|---|---|---|
| PET Layer Inches | PEI Layer Inches | Total Thickness Inches | | PET Layer Inches | PEI Layer Inches | Total Thickness Inches | Oxygen (21%) Transmission cc/pkg/24 hr. |
| .060 | .145 | .205 | ⇐ EXAMPLE A ⇒ | .004 | .012 | .016 | .020 |
| .100 | .105 | .205 | ⇐ EXAMPLE B ⇒ | .007 | .008 | .015 | .025 |
| .160 | .045 | .205 | ⇐ EXAMPLE C ⇒ | .012 | .005 | .017 | .031 |
| .160 | — | .160 | ⇐ CONTROL ⇒ | .015 | — | .015 | .053 |

Standard 1 liter preform ... = .910" OD
Bicomponent 1 liter preform ... = 1.000" OD
All preforms ... = .600" OD While in accordance with the patent statutes, the best mode and preferred embodiment have been described in detail, the invention is limited by the scope of the attached claims.

What is claimed is:

1. A multi-layer packaging material, comprising:
  (a) at least a layer made from a polyterephthalate compound or copolymers thereof, said polyterephthalate compound made by the reaction of terephthalic acid or esters thereof with ethylene glycol and up to 30 mole percent of one or more glycols having from 3 to 12 carbon atoms, said polyterephthalate copolymer made by reacting terephthalic acid or esters thereof and up to 30 mole percent of a 4 to 40 carbon atom dicarboxylic compound with ethylene glycol and up to 30 mole percent of one or more of a 3 to 12 carbon atom glycol, said polyterephthalate copolymer made by the reaction of one or more different said dicarboxylic compounds or one or more different said glycols, said dicarboxylic compound being other than terephthalic acid or an ester thereof and selected from the group consisting of an alkyl dicarboxylic acid, an aryl dicarboxylic acid, an alkyl substituted aryl dicarboxylic acid, a dimer carboxylic acid, a diester of an alkyl dicarboxylic acid, a diester of an aryl or alkyl substituted aryl carboxylic acid, an alkali sulfo dialkyl isophthalate, and combinations thereof; wherein said polyterephthalate compound has an intrinsic viscosity of 0.6 dl/g or greater and a glass transition temperature of from about 60° C. to about 100° C.; and (b) at least a layer made from a polyisophthalate compound or copolymers thereof, said polyisophthalate being the reaction product of an isophthalic compound and a glycol having from 2 to 12 carbon atoms, said isophthalic compound selected from the group consisting of isophthalic acid, and an alkyl ester of isophthalic acid having from 10 to 20 carbon atoms, said diol being ethylene gycol and containing from 0 to 60 mole percent of one or more compounds selected from the group consisting of a glycol having from 3 to 12 carbon atoms, a glycol ether having from 4 to 12 carbon atoms, and combinations thereof;

said copolymers of said polyisophtalate being the reaction product of said isophthalic compound, said diol, and up to 60 mole percent of a carboxylic compound having from 4 to 40 carbon atoms based upon said isophthalic compound and said dicarboxylic acid or said ester thereof, said dicarboxylic acid or ester thereof being other than said isophthalic compound wherein said polyisophthalate compound has an intrinsic viscosity of 0.5 dl/g or greater, a glass transition temperature of from about 35° C. to about 100° C., an oxygen permeability of 7 cc·mil/100 in$^2$·day·atm or less, and a $CO_2$ permeability of 30 cc·mil/100 in·day·atm or less; wherein the layer made from a polyisophthalate compound has a thickness which ranges from about 10 percent to about 90 percent of the total thickness of the packaging material.

2. A multi-layer packaging material according to claim 1, wherein said layers are contiguous to one another and wherein (a) said one or more dicarboxylic compounds forming said polyterephthalate layer is 20 mole percent or less and is selected from the group consisting of an alkyl dicarboxylic acid having from 4 to 12 carbon atoms, an aryl dicarboxylic acid having from 8 to 16 carbon atoms, an alkyl substituted aryl dicarboxylic acid having from 9 to 16 carbon atoms, a dimer dicarboxylic acid having from 34 to 40 carbon atoms, a diester of an alkyl dicarboxylic acid diester having from 6 to 20 carbon atoms, a diester of an aryl or an alkyl substituted aryl dicarboxylic acid having from 10 or 11 respectively to 20 carbon atoms, an alkali sulfo dimethyl isophthalate, and combinations thereof, wherein said one or more glycols is 20 mole percent or less and has from 3 to 10 carbon atoms or is a glycol ether having from 4 to 8 carbon atoms;

(b) wherein said isophthalic compound of said polyisophthalate layer is selected from the group consisting of isophthalic acid, an alkyl ester of isophthalic acid having from 10 to 16 carbon atoms, and combinations thereof, wherein said dicarboxylic compound forming said isophthalate copolymers is selected from the group consisting of an alkyl dicarboxylic acid having from 4 to 12 carbon atoms, an aryl or alkyl substituted aryl dicarboxylic acid having from 8 or 9, respectively, to 16 carbon atoms, a dimer acid having from 34 to 40 carbon atoms, a diester of an alkyl dicarboxylic acid having from 6 to 20 carbon atoms, a diester of an aryl or an alkyl substituted aryl dicarboxylic acid having from 10 or 11 respectively to 20 carbon atoms, an alkali sulfo dimethyl isophthalate, and combinations thereof;

wherein the amount of said dicarboxylic acid or ester thereof is from 0 to 30 mole percent when said acid is said alkyl acid or said dimer acid, and from 0 to 40 mole percent when said diacid compound is said remaining acids or esters; and wherein the amount of said diol other than said ethylene glycol and said glycol ether is 45 mole percent or less, wherein said diol has from 3 to 10 carbon atoms, and wherein said glycol ether has from 4 to 8 carbon atoms.

3. A multi-layer packaging material according to claim 2, where (a) said copolyterephthalate layer is made from one or more dicarboxylic compounds selected from the group consisting of an aryl acid having from 8 to 16 carbon atoms, an alkyl substituted aryl acid having from 9 to 16 carbon atoms, a diester of an alkyl substituted aryl dicarboxylic acid having from 11 to 20 carbon atoms, and combinations thereof, wherein said one or more glycols has from 3 to 8 carbon atoms, (b) wherein said isophthalic compound is selected from the group consisting of isophthalic acid, dimethylisophthalate, and diethylisophthalate, wherein said dicarboxylic acid forming said polyisophthalate copolymer is terephthalic acid, and wherein said dicarboxylic ester is dimethylterephthalate, and wherein said diol other than said ethylene glycol is a diol having from 3 to 8 carbon atoms and wherein said amount is 35 mole percent or less.

4. A multi-layer article according to claim 3, wherein said polyisophthalate compound has an oxygen permeability of less than 5, a glass transition temperature from about 55° C. to about 75° C., and a carbon dioxide permeability of 20 or less, and wherein said polyterephthalate compound has a glass transition temperature of from about 65° C. to about 75° C.

5. A multi-layer article according to claim 4, wherein (a) said polyterephthalate layer is poly (ethylene terephthalate), and (b) wherein said polyisophthalate layer is made from an isophthalic compound selected from the group consisting of isophthalic acid, dimethylisophthalate, and diethylisophthalate, wherein said diol other than said ethylene glycol is a diol selected from the group consisting of cyclohexane dimethylol, tetramethylene glycol, and propylene glycol, wherein the amount of said glycol is 35 mole percent or less, and wherein said dicarboxylic acid forming said polyisophthalate copolymer is selected from the group consisting of terephthalic acid, a dimer acid having 36 carbon atoms, dimethylterephthalate, azelate, and 2,6-naphthalene dicarboxylate, the amount of said acid or ester being 30 mole percent or less.

6. A multi-layer packaging material according to claim 5, wherein said polyisophthalic compound is poly(ethylene isophthalate) and wherein said polyterephthalate compound is poly(ethylene terephthalate).

7. A multi-layer packaging material according to claim 6, wherein the thickness of said polyisophthalate layer ranges from about 25 to about 75 percent of the thickness of said article.

8. A multi-layer packaging material according to claim 1, 2, 3, 5, or 6, wherein said packaging material is in the form of a container.

9. A multi-layer packaging material according to claim 8, wherein said container is a bilayer bottle, and wherein said outside layer is polyisophthalate compound and wherein said inside layer is polyterephthalate compound.

10. A multi-layer packaging material according to claim 9, wherein said bottle is for containing an alcoholic beverage.

11. A multi-layer packaging material according to claim 1, 2, 3, 5, or 6, wherein said polyisophthalate layer has a colorant material therein.

12. A multi-layer packaging material according to claim 1, 2, 3, 5, or 7, wherein said packaging material is a molded article.

13. A multi-layer packaging material according to claim 12, wherein said molded article is a bottle.

14. A multi-layer packaging material, comprising:
(a) at least a layer made from a polyterephthalate compound, said polyterephthalate compound being made by the reaction of a compound selected from the group consisting of terephthalic acid, dimethylphthalate, diethylphthalate, and combinations thereof with ethylene glycol, wherein said polyterephthalate compound has an intrinsic viscosity of 0.6 dl/g or greater and a glass transition temperature of from about 60° C. to about 100° C.; and
(b) at least a layer made from a polyisophthalate compound or copolymers thereof, said polyisophthalate compound made by the reaction of an isophthalic compound selected from the group consisting of isophthalic acid, dimethylisophthalate, and diethylisophthalate with a glycol, wherein said glycol is ethylene glycol which contains from 0 to 35 mole percent of one or more diols selected from the group consisting of cyclohexanedimethylol, tetramethylene glycol, and propylene glycol, said copolymers of said polyisophthalate compound being the reaction product of said isophthalic compound, said glycol, and up to 30 mole percent of a dicarboxylic compound selected from the group consisting of terephthalic acid, a dimer acid having 36 carbon atoms, dimethylterephthalate, azelate, and 2,6-naphthalene dicarboxylate, wherein said polyisophthalate compound has an intrinsic viscosity of 0.5 dl/g or greater, a glass transition temperature of from about 35° C. to about 100° C., an oxygen permeability of 7 cc·mil/100 in$^2$·day·atm or less, and a $CO_2$ permeability of 30 cc·mil/100 in·day·atm or less; wherein the layer made from a polyisophthalate compound has a thickness which ranges from about 10 percent to about 90 percent of the total thickness of the packaging material.

15. A multi-layer article according to claim 14, wherein said polyisophthalate compound has an oxygen permeability of less than 5, a glass transition temperature from about 55° C. to about 75° C., and a carbon dioxide permeability of 20 or less, and wherein said polyterephthalate compound has a glass transition temperature of from about 65° C. to about 75° C.

16. A multi-layer packaging material according to claim 15, wherein said polyisophthalate layer thickness ranges from about 20 percent to about 80 percent of the total thickness of the packaging material.

17. A multi-layer article according to claim 16, wherein
(a) said polyterephthalate layer is poly(ethylene terephthalate), and
(b) wherein said polyisophthalate layer is made from an isophthalic compound selected from the group consisting of isophthalic acid, dimethylisophthalate, and diethylisophthalate,
wherein said diol other than said ethylene glycol is a diol selected from the group consisting of cyclohexane dimethylol, tetramethylene glycol, and propylene glycol, wherein the amount of said glycol is 35 mole percent or less, and
wherein said dicarboxylic acid forming said polyisophthalate copolymer is selected from the group consisting of terephthalic acid, a dimer acid having 36 carbon atoms, dimethylterephthalate, azelate, and 2,6-napthalene dicarboxylate, the amount of said acid or ester being 30 mole percent or less.

18. A multi-layer packaging material according to claim 17, wherein said polyisophthalic compound is poly(ethylene isophthalate) and wherein said polyterephthalate compound is poly(ethylene terephthalate).

19. A multi-layer packaging material according to claim 18, wherein the thickness of said polyisophthalate layer ranges from about 25 to about 75 percent of the thickness of said article.

20. A multi-layer packaging material according to claim 19, wherein said packaging material is in the form of a container.

21. A multi-layer packaging material according to claim 20, wherein said container is a bilayer bottle, and wherein said outside layer is polyisophthalate compound and wherein said inside layer is polyterephthalate compound.

22. A multi-layer packaging material according to claim 21, wherein said bottle is for containing an alcoholic beverage.

23. A multi-layer packaging material according to claim 22, wherein said polyisophthalate layer has a colorant material therein.

24. A multi-layer packaging material according to claim 19, wherein said packaging material is a molded article.

25. A multi-layer packaging material according to claim 24, wherein said molded article is a bottle.

* * * * *